United States Patent
Wu et al.

(10) Patent No.: US 10,726,256 B2
(45) Date of Patent: Jul. 28, 2020

(54) COUNTERFEIT DETECTION SCHEME USING PAPER SURFACES AND MOBILE CAMERAS

(71) Applicant: UNIVERSITY OF MARYLAND, COLLEGE PARK, College Park, MD (US)

(72) Inventors: Min Wu, Clarksville, MD (US); Chau-Wai Wong, Apex, NC (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 78 days.

(21) Appl. No.: 15/775,977

(22) PCT Filed: Nov. 14, 2016

(86) PCT No.: PCT/US2016/061875
§ 371 (c)(1),
(2) Date: May 14, 2018

(87) PCT Pub. No.: WO2017/083841
PCT Pub. Date: May 18, 2017

(65) Prior Publication Data
US 2018/0330159 A1  Nov. 15, 2018

Related U.S. Application Data

(60) Provisional application No. 62/255,134, filed on Nov. 13, 2015.

(51) Int. Cl.
*G06K 9/00* (2006.01)
*G07D 7/12* (2016.01)
(Continued)

(52) U.S. Cl.
CPC .......... *G06K 9/00577* (2013.01); *G06K 9/22* (2013.01); *G06K 9/4661* (2013.01); *G07D 7/12* (2013.01)

(58) Field of Classification Search
CPC .... G06K 9/00577; G06K 9/22; G06K 9/4661; G07D 7/12
See application file for complete search history.

(56) References Cited

U.S. PATENT DOCUMENTS 8,180,174 B2    5/2012  Di Venuto et al.
2007/0228166 A1  10/2007  Lui
(Continued)

FOREIGN PATENT DOCUMENTS

EP    2024899 A1   2/2009
WO   2007028799 A1  3/2007

OTHER PUBLICATIONS

Chau-Wai Wong et al., "Counterfeit Detection Based on Unclonable Feature of Paper Using Mobile Camera", IEEE Transactions on Information Forensics and Security, vol. 12, No. 8, Aug. 2017, pp. 1885-1899.
(Continued)

*Primary Examiner* — Jamil Ahmed
(74) *Attorney, Agent, or Firm* — Squire Patton Boggs (US) LLP (57) ABSTRACT

Various authentication systems may benefit from detection of counterfeits. More particularly, certain authentication systems may benefit from a counterfeit detection scheme applicable to paper surfaces that can employ mobile cameras, such as the cameras associated with mobile phones. A method, according to certain embodiments, can include illuminating a surface of an item with a lighting source of a device. The method can also include capturing a plurality of images of the surface by a camera of the device during the
(Continued)

illumination of the surface. The method can further include authenticating the item based on the plurality of images.

26 Claims, 9 Drawing Sheets (51) Int. Cl.
*G06K 9/22* (2006.01)
*G06K 9/46* (2006.01)

(56) References Cited

U.S. PATENT DOCUMENTS

| | | |
|---|---|---|
| 2008/0112596 A1* | 5/2008 | Rhoads .............. G06K 9/00577 382/115 |
| 2010/0200649 A1 | 8/2010 | Callegari et al. |
| 2011/0096955 A1 | 4/2011 | Voloshynovskiy et al. |
| 2012/0243797 A1 | 9/2012 | Di Venuto Dayer et al. |

OTHER PUBLICATIONS

Chau-Wai et al., "Counterfeit Detection Using Paper PUF and Mobile Cameras", IEEE International Workshop on Information Forensics and Security (WIFS), 2015, 6 pages.
International Search Report and Written Opinion issued in corresponding International Application No. PCT/US2016/061875 dated Jan. 19, 2017.

* cited by examiner

COUNTERFEIT DETECTION SCHEME USING PAPER SURFACES AND MOBILE CAMERAS

CROSS-REFERENCE TO RELATED APPLICATION

This application is related to and claims the benefit and priority of U.S. Provisional Patent Application No. 62/255,134, filed Nov. 13, 2015, the entirety of which is hereby incorporated herein by reference. "Counterfeit detection using paper PUF and mobile cameras," a paper published by the inventors in IEEE International Workshop on Information Forensics and Security (WIFS'15), Rome, Italy, 16-19 Nov. 2015, is also incorporated herein by reference in its entirety. "Counterfeit Detection Based on Unclonable Feature of Paper Using Mobile Camera," a paper by the inventors for IEEE Transactions on Information Forensics and Security (TIFS), is also incorporated herein by reference in its entirety.

BACKGROUND

Field

Various authentication systems may benefit from detection of counterfeits. More particularly, certain authentication systems may benefit from a counterfeit detection scheme applicable to paper surfaces that can employ mobile cameras, such as the cameras associated with mobile phones.

Description of the Related Art

Merchandise packaging and valuable documents such as tickets and IDs are common targets for counterfeiters. Traditional high cost surface structures have sometimes been employed to defeat counterfeiting, such as holograms, ultraviolet (UV) ink, or random colored fibers. These techniques tend to be expensive, have a weak ground truth, and authenticity detection relies on a manual decision by a recipient of the item.

As an alternative, low cost surface structures have been exploited for counterfeit detection by using their optical features. The randomness of the surface makes the structures physically unclonable or difficult to clone to deter duplications. Extrinsic surface structures can be created by adding ingredients such as fiber, small plastic dots, air bubble, powders/glitters that are foreign to the surface. Intrinsic surface structures can also be intrinsic by exploring the optical effect of the microscopic roughness of the surface, such as the paper surface formed by inter-twisted wood fibers.

The uniqueness of the inherent 3-D structure of the paper surface that can be exploited for authentication purposes is due to overlapped and inter-twisted wood fibers.

There are two fundamental types of reflection models: specular and diffuse. The perceived intensity due to the mirror-like specular reflection is mainly dependent on the angle between the directions of the reflected light and eye/sensor, whereas the perceived intensity due to diffuse reflection is mainly dependent on the angle between the directions of incident light and the normal of the microscopic surface. Most surfaces are combinations of both surface types.

A piece of paper at different regions can have different dominant reflection types, but treating paper as a fully diffuse surface is one option. The majority of locations may follow this model, and the remaining locations can be considered outliers under this model.

Figure 1:
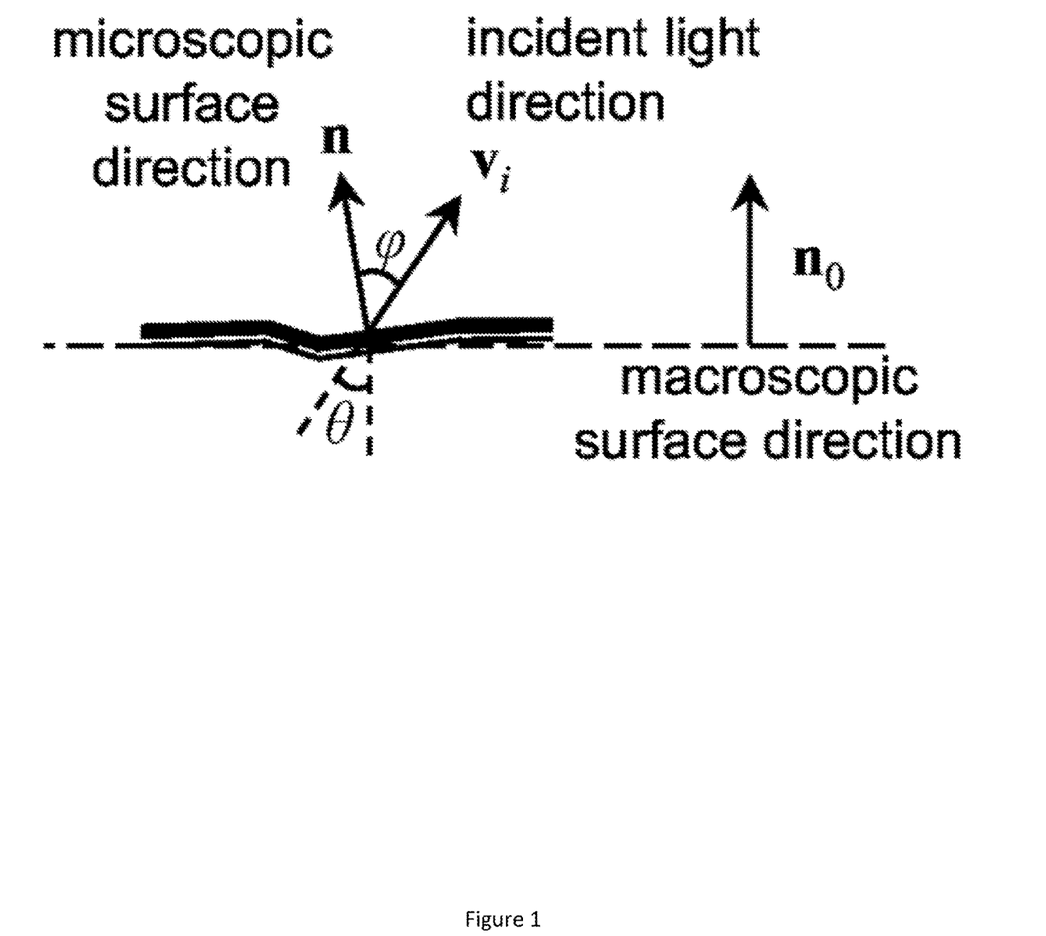
FIG. 1 shows the normal direction and incident light direction of a particular spot in a microscopic view of a surface.

FIG. 1 shows the surface normal direction and incident light direction of a particular spot in a microscopic view. The perceived intensity of the fully diffuse reflection model, $l_r = \lambda \cdot l \cdot n^T v_i$, where $l \propto \cos^K \theta$ and $n^T v_i = \cos \varphi$, depends on the angle y between normal direction of the surface at microscopic level, $n = (n_x, n_y, n_z)$, and the direction where the incident light coming from, $v_i = (v_{i,x}, v_{i,y}, v_{i,z})$; the strength of the light at the current spot, l; and the albedo, $\lambda$, characterizing the physical capability of reflecting the light. In this discussion, $\lambda$ is assumed to be constant over a whole paper patch. Parameter l can be modelled in proportion to $\cos^K \theta$, where K is a positive number accounting for the effect of energy fall-off according to the inverse-square law, the effect of foreshortening, etc., and $\theta$ is the angle of incidence.

In the case of a scanner, $\theta$ is a factory specified design parameter relating to the position of the linear light source and therefore fixed for every pixel location; in the case of cameras, $\theta$s are generally different for neighboring pixel locations.

SUMMARY

A method, according to certain embodiments, can include illuminating a surface of an item with a lighting source of a device. The method can also include capturing a plurality of images of the surface by a camera of the device during the illumination of the surface. The method can further include authenticating the item based on the plurality of images.

An apparatus, in certain embodiments, can include a light of a device configured to illuminate a surface of an item. The apparatus can also include a camera of the device configured to capture a plurality of images of the surface during the illumination of the surface. The apparatus can further include a processor of the device configured to authenticate the item based on the plurality of images.

According to certain embodiments, an apparatus can include means for illuminating a surface of an item with a lighting source of a device. The apparatus can also include means for capturing a plurality of images of the surface by a camera of the device during the illumination of the surface. The apparatus can further include means for authenticating the item based on the plurality of images.

BRIEF DESCRIPTION OF THE DRAWINGS

For proper understanding of the invention, reference should be made to the accompanying drawings, wherein.

DETAILED DESCRIPTION

Figure 2A:
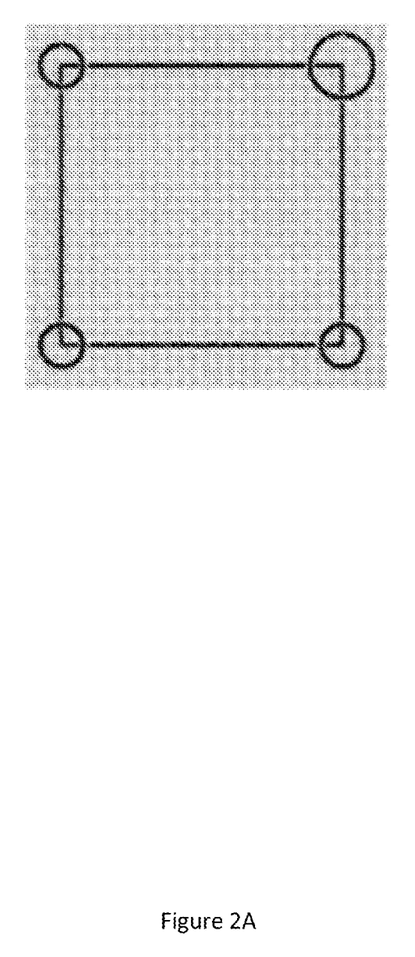
FIG. 2A illustrates the design of a registration container according to certain embodiments.

FIG. 2A illustrates the design of a registration container according to certain embodiments. This registration container can facilitate precise registration in experiments or in practical applications. Considering 600 pixels per inch printing resolution, the container can be a square box of 400-by-400 in pixels, the line width can be 5 pixels, and there can be four circles at the corners. A preliminary alignment based on four boundaries can be achieved using a Hough transform, and subpixel resolution refinement with perspective transform compensation can then be carried out based on the circle markers. Lens location relative to the captured surface in the world coordinate system can be readily calculated from the estimated perspective transform matrix, and then the direction of incident light at every pixel location can be known.

Figure 2B:
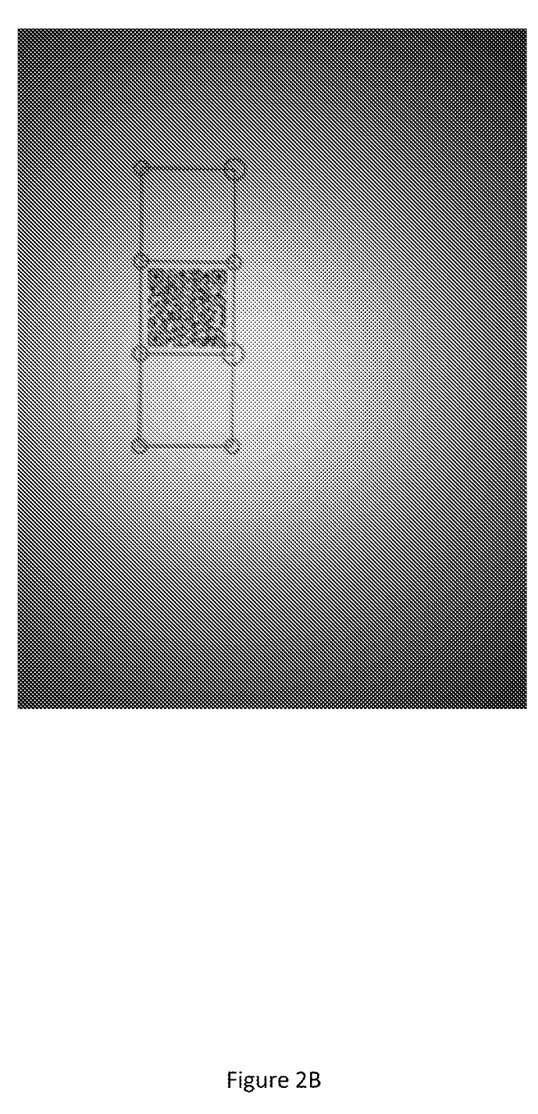
FIG. 2B illustrates a tri-patch design of a registration container according to certain embodiments.

FIG. 2B illustrates a tri-patch design of a registration container according to certain embodiments. The registration container in this example can include three of the designs illustrated in FIG. 2A, with the additional incorporation of printed data, such as a quick response (QR) code in the central of the three patches. Alternatively or in addition, the information could be in another form than a QR code and could be located outside the patches or in another of the patches.

Optical characteristics of physically unclonable features (PUFs) can be used for verification. The PUF verification problem can be approached as an image authentication problem commonly formulated as hypothesis tests. The null hypothesis $H_0$ corresponds to incorrectly matched pairs of test and reference patches, whereas the alternative hypothesis $H_1$ corresponds to correctly matched pairs. The optimal decision rule maximizing the statistical power is the likelihood-ratio test (LRT): rejects $H_0$ if $$\frac{f_1(x)}{f_0(x)} \geq \tau$$

holds, where x represents the test patch, $f_0$ and $f_1$ are the probability density functions under null and alternative hypotheses respectively, and $\tau$ is a threshold.

As a simple example, a hypothesis testing model differentiating a known reference image w against all other images can be as follows:

$$H_0: x=e_0, \ e_0 \sim N(m1, \Sigma_0),$$

$$H_1: x=w+e_1, \ e_0 \sim N(0, \sigma_1^2 I).$$

Here, normally distributed $e_0$ stochastically represents any acquired image with a non-degenerate covariance matrix $\Sigma_0$ for image content and acquisition noise, 1 is an all 1 vector with the same dimension as x, m corresponds to a value at the center of the linear range of the digital representation of luminance (i=128 for intensity in the range [0, 255]), w deterministically represents the reference image, and el is the image acquisition noise (white Gaussian, with constant variance $\sigma_1^2$). When the patch x is represented by the x-component or y-component of the normal vector field, the above under the hypothesis test setup is still valid with m=0. Sample correlation coefficient $\hat{\rho}(w, x)$ against a threshold can be used as the decision rule, as in this discussion.

Without knowing the exact direction of incident light, an estimate of one component can be obtained as the difference between two scans in exactly opposite directions, canceling the effect of the unknown incident direction of the scanner light. See, for example, Clarkson et al. "Fingerprinting blank paper using commodity scanners," in Proc. IEEE Symposium on Security and Privacy, Berkeley, Calif., May 2009, pp. 301-314.

Certain embodiments of the present invention address, for example, a paper authentication problem by exploiting optical features through mobile imaging devices to characterize the unique, physically unclonable properties of paper surface.

Prior work showing high matching accuracy either used a consumer-level scanner for estimating a projected normal vector field of the surface of the paper as the feature for authentication, or used an industrial camera with controlled lighting to obtain an appearance image of the surface as the feature. Moreover, past explorations based on mobile cameras were very limited and have not had substantial success in obtaining consistent appearance images. One way to improve the authentication performance is to use the intensity gradient based features of visually observable dots that are less sensitive to the change of lighting, at the cost of increasing the design complexity of the authentication system.

Certain embodiments of the present invention recognize that the failure of past approaches with mobile cameras is due in part to the uncontrolled nature of the ambient light. More particularly, certain embodiments directly use images captured by mobile cameras for authentication by exploiting the camera flashlight to create a semi-controlled lighting condition.

Certain embodiments also provide methods for estimating the microscopic normal vector field of paper surface using multiple camera-captured images of different viewpoints. Thus, restricted imaging setups can be relaxed to enable paper authentication under a more casual, ubiquitous setting of a mobile imaging device, which may facilitate duplicate or other counterfeit detection of paper documents and merchandise packaging.

For example, certain embodiments focus on the intrinsic property of the paper surface for counterfeit detection and deterrence. Optionally, however, the same techniques may also be applied to other kinds of surfaces beside paper surfaces, such as fabric surfaces, leather surfaces, or any other surface with optically detectable microscopic surface variation. Certain embodiments provide for a more casual, ubiquitous imaging setup using consumer-level mobile cameras under commonly available lighting conditions.

As mentioned above, features based on intensity gradient of visually observable dots may be less sensitive to the change of lighting and may be used for authentication at the cost of higher algorithm complexity and moderate discrimination capabilities. Thus, certain embodiments may incorporate such features in combination with the approaches described herein. Furthermore, anti-duplication or anti-counterfeiting techniques may also or alternatively rely on other characteristics of a protected item.

Two aspects of a process may facilitate paper authentication via mobile cameras. First, the mobile captured images can be configured to be comparable in resolution and contrast to those captured by scanners. Second, lighting can be controlled to render a desirable image appearance of the paper.

The first aspect can be qualitatively confirmed by comparing the acquired images from scanners and mobile cameras. Images acquired in both ways do have significant intensity fluctuations within small neighborhoods of pixels. The second aspect can be fulfilled by activating the flash next to the camera lens on devices such as mobile devices. As the relative position of the flash is fixed with respect to the lens, the appearance of the surface can be reasonably expected for a given position between the camera and the paper.

The use of camera flash can significantly improve the authentication performance of appearance images, and more importantly, can allow for the estimation of the normal vector field in fine surface details. By knowing the estimated location of the lens, the direction of incident light for every pixel of the paper can be calculated. Then, the normal vector of a particular pixel can be estimated by using the fully diffuse reflection model, with a special treatment on the non-uniform intensity in camera images due to different distances from pixel locations to the flash. Thus, mobile camera-based techniques can obtain an effective estimate of the normal vector field of the paper surface to enable authentication.

As uncontrolled light source(s) may be a major reason for low authentication performance using the appearance images as the feature, a semi-controlled lighting condition with the help of the built-in flashlight of mobile cameras can achieve proper authentication. The relative positions among the light source, lens, and the paper patch can be known, or at least can be estimated.

A simple case would be using the appearance of patches captured at locations relatively fixed to the lens so that the effect of lighting is the same. A more sophisticated case discussed below is to understand the physics of lighting and with multiple appearance images to estimate the normal vector field of the surface for authentication.

Because the image appearance is highly dependent on the camera's design parameters, such as relative positions of the lens and flash, as well as the reflectivity or shadowing of the case, the approach may take into account that the acquisition device at the user side cannot be limited to a particular model.

In a simple case, for example, a reference image can be taken using a device with a built-in camera and lighting source, such as an LED flash or other flash. The reference image can then compared to a subsequently captured image, which can be captured under the same camera-surface geometry using the same type of device with the same physical layout of camera lens and lighting source. If a correlation between the images is high enough, then authenticity can be confirmed.

Because modern mobile cameras have improved in resolution in capturing fine details, it may be possible to estimate the normal vector field by using multiple appearance images. This may be done if, for example, issues of camera geometry and lighting can be addressed.

Photometric stereo can be used to reconstruct surfaces using appearance images captured at different perspectives. However, the challenge here is that the scale of interested surface is much smaller. The physical model of light reflection can be appropriately selected and the lighting can be controlled to exploit the possibility of obtaining meaningful estimates of the normal vector field.

Given a generally flat paper surface and a typical mobile phone camera, there can be a gentle spatial intensity change at large scale, namely a gentle macroscopic intensity change, with circular shaped level curves. This macroscopic intensity can be compensated to reveal the intensity change due to the change of orientation of microscopic surface.

The macroscopic intensity may be proportional to the light strength at the surface, l, and cosine of the incident angle, $\theta$. We approximate the macroscopic intensity by the averaged perceived intensity of background pixels over a small neighborhood N around a pixel location p:

$$\bar{I}_r(p) = \frac{1}{|N(p)|} \sum_{k \in N(p)} \lambda \cdot l(k) \cdot n(k)^T v_i(k)$$

$$(a) \approx \lambda \cdot l(p) \cdot \left[\frac{1}{N(p)} \sum n(k)\right]^T v_i(p)$$

$$(b) \approx \lambda \cdot l(p) \cdot E[n(p)]^T v_i(p)$$

$$(c) \approx \lambda \cdot l(p) \cdot [0, 0, \mu_{n_z}] v_i(p) = \lambda \cdot l(p) \cdot \mu_{n_z} \cdot v_{i,z}(p)$$

where $v_{i,z}(p) = \cos \theta$ at p, and where $|N(p)|$ is number of pixels in the small neighborhood of p. Line (a) follows from the fact that l(k) and $v_i(k)$ are approximately constant over a small neighborhood. Line (b) follows from ergodicity. Line (c) follows from the assumption that normal vectors are on average pointing straight up, $E[n_x]=E[n_y]=0$ and $E[n]=\mu_{n_z}$, where $\mu_{n_z}$ is a modeling constant between 0 and 1.

For simplicity, median filtering can be applied over different shots. Thus, satisfactory estimation results for macroscopic intensity $\bar{I}_r$ can be obtained. With an estimated macroscopic intensity image $\bar{I}_r$, the normalized intensity, $\zeta(p)$, of an image at a particular location p can be defined by compensating the macroscopic intensity, as below:

$$\zeta(p) \overset{def}{=} \frac{l_r(p)}{\bar{I}_r(p)} \cdot \mu_{n_z} \cdot v_{i,z}(p) = n(p)^T v_i(p)$$

where n is the unknown normal vector to be estimated, $\mu_{n_z}$ is the unknown modeling constant, $l_r$ is the image acquired under flashlight, and the terms $v_i$, $\bar{I}_r$, and $v_{i,z}$ are already estimated. Normalized images can be obtained by dividing the original image captured under flashlight by the macroscopic intensity image.

In order to quickly examine the correctness of modeling, parameter estimation can be carried out using handy off-the-shelf estimators such as least-squares. To obtain meaningful estimates with least-squares, a paper patch can be captured at more than four different camera locations with respect to the paper, where four is sum of the three unknown parameters of a normal vector and one image intensity offset parameter to be determined. The image intensity offset parameter can be a parameter that describes the offset of the image intensity. Capturing the patch at 20 camera locations is one example, although other numbers of capture locations are also permitted.

The normal vectors at every pixel location can be estimated for a total of 200×200 pixels. For each pixel location p, a system of linear equations can be set up for solving the normal vector with known or estimated quantities:

$$\begin{bmatrix} \zeta_1 \\ \vdots \\ \zeta_M \end{bmatrix} = \begin{bmatrix} v_1 & 1 \\ \vdots & \vdots \\ v_M & 1 \end{bmatrix} \begin{bmatrix} n_x \\ \vdots \\ b \end{bmatrix} + \begin{bmatrix} e_1 \\ \vdots \\ e_M \end{bmatrix}$$

where $$\begin{bmatrix} \zeta_1 \\ \vdots \\ \zeta_M \end{bmatrix}$$

can be referred to as $\zeta$, $$\begin{bmatrix} v_1 & 1 \\ \vdots & \vdots \\ v_M & 1 \end{bmatrix}$$

can be referred to as X, $$\begin{bmatrix} n_x \\ \vdots \\ b \end{bmatrix}$$

can be referred to as $\beta$, and $$\begin{bmatrix} e_1 \\ \vdots \\ e_M \end{bmatrix}$$

can be referred to as e. The unknown parameter $\beta$ can contain the normal vector and an intercept capturing any intensity bias, for example due to ambient light, at location p. The observation vector $\zeta$ can consist of normalized intensity values at the collocated position p from images #1 to #M. The data matrix X can be composed of vectors of incident directions. Noise from measurement and/or modeling can be modeled by the zero-mean error vector e.

The estimated normal vector field can give satisfactory authentication performance. Various factors, however, may affect the authentication performance.

In certain embodiments, twenty images can be used to estimate four parameters in order to obtain good estimates with high confidence. However, even with merely five images, the authentication performance can still be satisfactory in the sense that the sample correlation values may be significantly greater than 0 for correct matches. Thus, the number of images can be one such factor that can affect performance.

Another factor that can affect performance is the precision of the estimated lens location. The incident light direction $v_i$ may have a significant effect on obtained estimates for the normal direction field. In certain embodiments, $v_i$ is itself an estimate from the perspective transform matrix that may be inaccurately estimated. When perturbation is in x- (or y-) direction, the x- (or y-) component of the estimated normal vector field may have a reduction of about 0.15 in correlation, and the other component may have no change. When perturbation is in diagonal directions, both x- and y-components may have a reduction of about 0.1 in correlation. In spite of the reduction in correlation, the correct matches can still be perfectly separated from incorrect matches. Hence, the lens location estimation and the authentication performance may not be significantly affected by a 10°-bias of the estimated lens location.

Certain embodiments may have various benefits and/or advantages. For example, according to certain embodiments it may be possible to use cameras and built-in flashlights of mobile devices to estimate the normal vector field that is an intrinsic microscopic feature of the paper surface for authentication purposes. Certain embodiments may, therefore, relax restricted imaging setup to enable paper authentication under a more casual, ubiquitous setting of a mobile imaging device, which may facilitate duplicate detection of paper documents and merchandise packaging.

Certain embodiments may also be applicable to scenarios in which the camera is not in parallel with the paper surface. This may pose a challenge due to the out-of-focus blur effect that may occur over parts of the paper surface.

Figure 3:
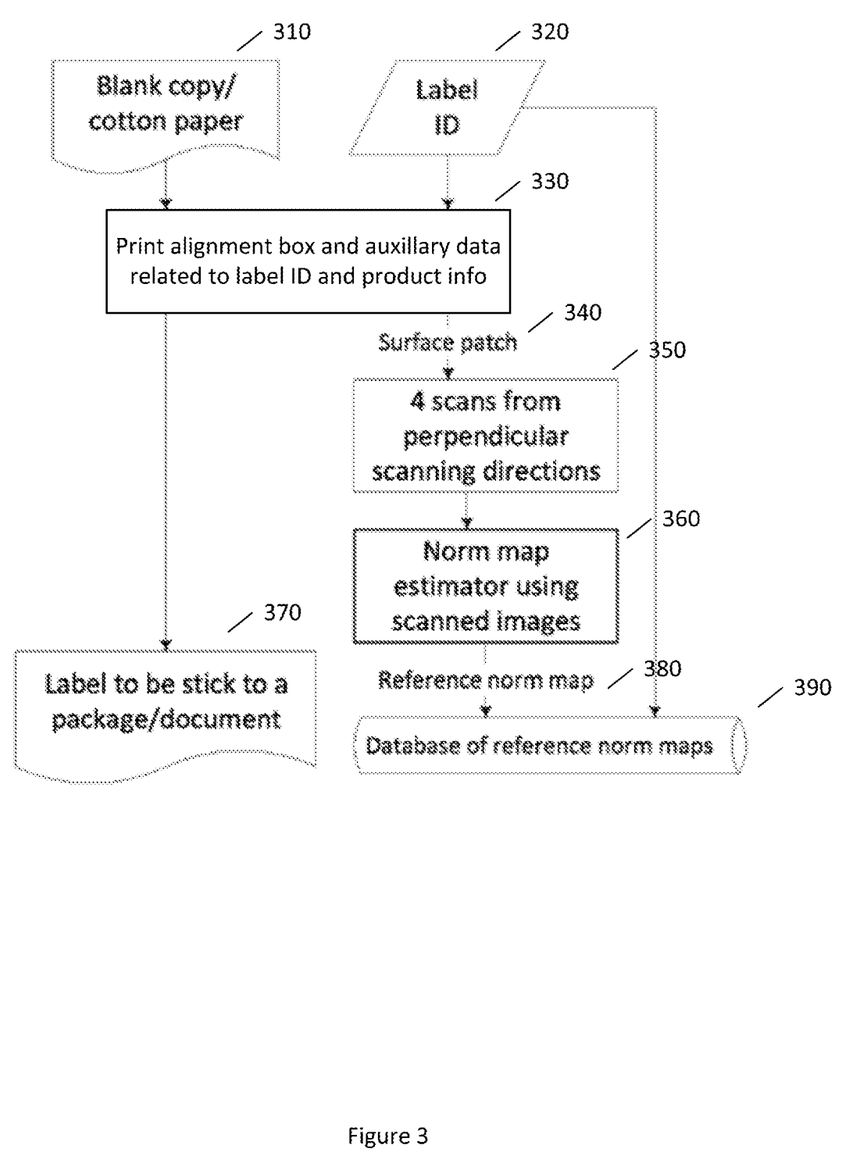
FIG. 3 illustrates a block diagram of preparing an authenticatable item, according to certain embodiments of the present invention.

FIG. 3 illustrates a block diagram of preparing an authenticatable item, according to certain embodiments of the present invention. As shown in FIG. 3, blank copy/cotton paper 310 can have a label ID 320 applied to it in a process 330 of printing an alignment box and quick response (QR) code or other auxiliary data, such as data related to label ID and product information. A QR code is just an example of a way to obtain auxiliary data, such as a label ID, to facilitate matching and authentication.

This process 310 can produce a label 370 to be stuck to a package or document. More generally, the result of printing at 310 can provide a surface patch 340. At 350, there can be four scans from perpendicular scanning directions. A norm map can be estimated at 360 using the scanned images. This can be provided as a reference norm map 380.

Figure 4:
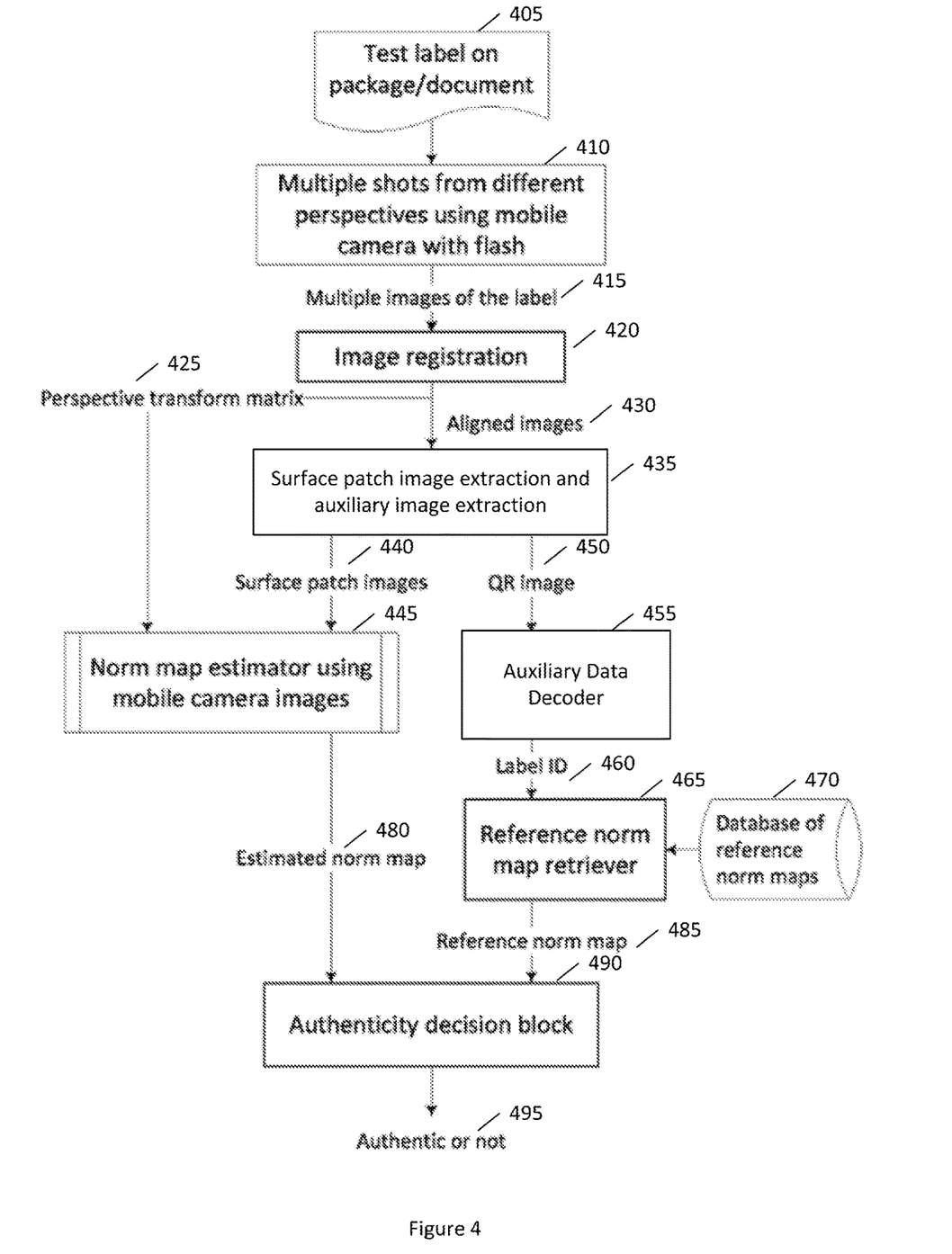
FIG. 4 illustrates a block diagram of authenticating an authenticatable item, according to certain embodiments of the present invention.

FIG. 4 illustrates a block diagram of authenticating an authenticatable item, according to certain embodiments of the present invention. As shown in FIG. 4, at 405 there can be a testable label 405 on a package/document. The user or user equipment can, at 410, take multiple shots from different perspectives using a mobile camera with a flash. This may generate multiple images 415 of the label. Image registration can occur at 420. This image registration at 420 can provide a perspective transform matrix 425 and aligned images 430. Surface patch image extraction and QR image extraction or other auxiliary data extraction can occur at 435, and can yield surface patch images 440 and QR image 450 or image of other auxiliary data. For example, certain embodiments are not limited to QR images, but can also apply to bar code, text, or any other form of auxiliary data.

A norm map estimator 445 can use mobile camera images. This estimator 445 can rely on both the perspective transform matrix 425 and surface patch images 440. An output of the estimator 445 can be an estimated norm map 480.

A QR decoder or other auxiliary data decoder 455 can decode the QR image (or other auxiliary data) to obtain a label ID 460. A reference norm map retriever 465 can rely on the label ID 460 and a database 470 of reference norm maps, to yield a reference norm map 485.

An authenticity decision block 490 can compare the estimated norm map 480 to the reference norm map 485. Based on the comparison, the authenticity decision block 490 can yield an authentic or not output 495.

Figure 5:
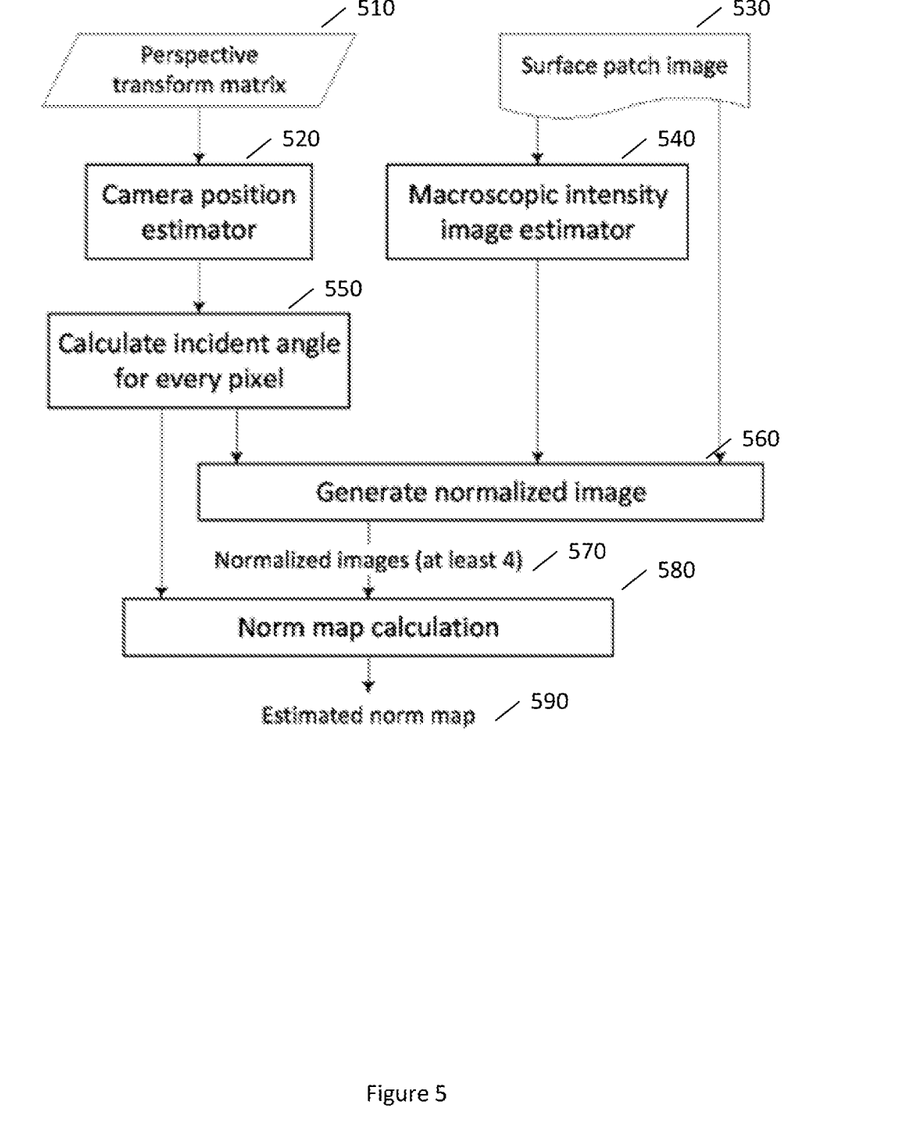
FIG. 5 illustrates details of a norm map estimator, according to certain embodiments of the present invention.

FIG. 5 illustrates details of a norm map estimator, according to certain embodiments of the present invention. As shown in FIG. 5, a norm map estimator can receive a perspective transform matrix 510. A camera position estimator 520 can process the perspective transform matrix 510. The norm map estimator can also receive a surface patch image 530 and process it in a macroscopic intensity image estimator 540.

The norm map estimator can, at 550, calculate an incident angle for every pixel. Using an output from 550 together with an output of macroscopic intensity image estimator 540 and surface patch image 530, the norm map estimator can, at 560, generate a normalized image. This generation step at 560 can be done on multiple images to yield multiple normalized images, for example, at least four normalized images at 570. The normalized images 570 and an output of the calculation of incident angles at 550 can be used to perform a norm map calculation at 580, thereby yielding an estimated norm map 590.

Figure 6:
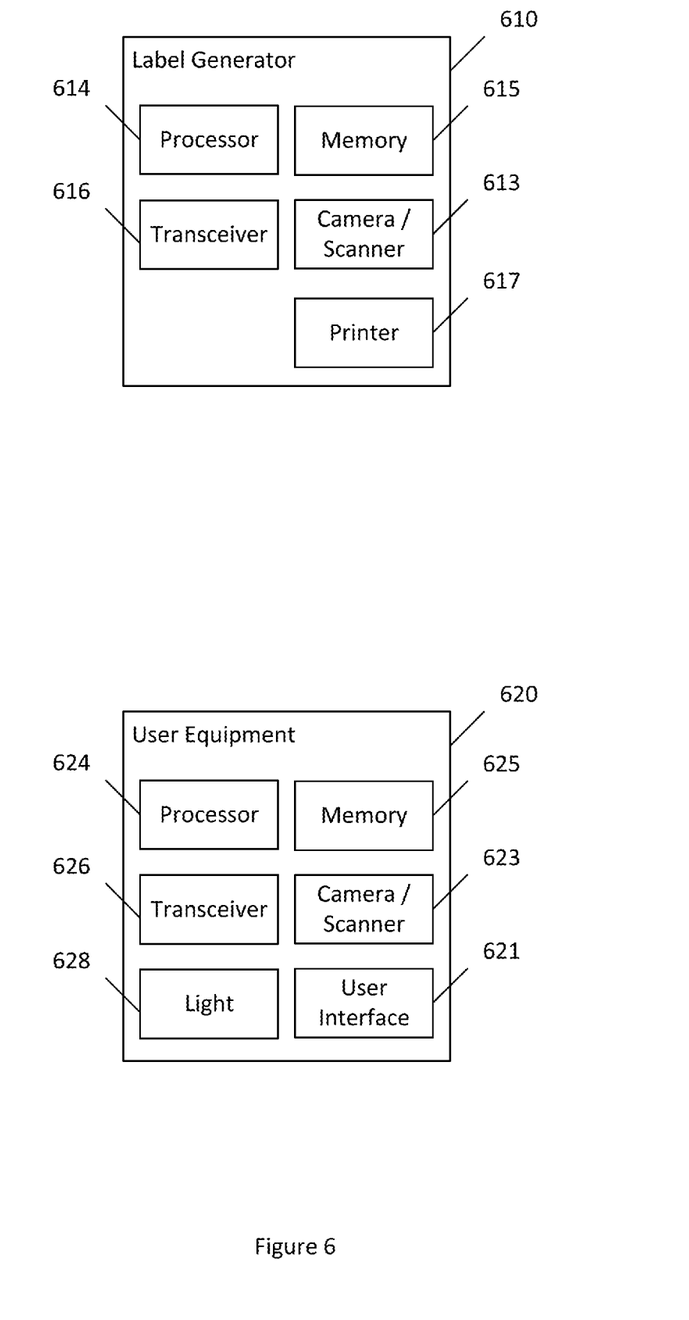
FIG. 6 illustrates a system according to certain embodiments of the present invention.

FIG. 6 illustrates a system according to certain embodiments of the present invention. As shown in FIG. 6, a system can include a label generator 610 and a user equipment 620. Both devices can include at least one processor 614, 624, at least one memory 615, 625, a transceiver 616, 626, and a camera or scanner 613, 623 (both a camera and a scanner may be present, if desired). Optionally other suitable equipment can be substituted for camera/scanner 613, such as using an alternative technology for mapping, such as microscopic analysis. The label generator 610 may also include a printer 617. The printer 617 can be configured to print a physical label, which may include a QR code or other metadata as described above. The user equipment 620 may include a user interface 621, which may be configured to provide an output of an authentication result, as described above.

The processor(s) 614, 624 may be any suitable circuitry, chip, central processing unit, or application specific integrated circuit. The memory(ies) 615, 625 may be any storage mechanism, such as random access memory (RAM), read only memory (ROM), flash memory, solid state drive memory, electronically programmable memory, or the like. The processor(s) 614, 624 and memory(ies) 615, 625 can be provided on a same chip as one another, or on different chips. The memory(ies) 615, 625 can include computer program instructions, such as computer program code, in any desired form, such as machine code, interpreted code, or the like.

The devices can be configured to use their transceiver 616, 626 to communicate across a network either with one another or with a third or other devices, such as an external database of reference norm maps, as mentioned above.

The user equipment 620 can further include a light 628, such as a built-in flash. For example, the user equipment 620 can be mobile camera phone, with a built-in flash.

The devices of FIG. 6 may provide the means for executing any of the methods described herein. The devices can operate alone or in combination with one another.

Figure 7:
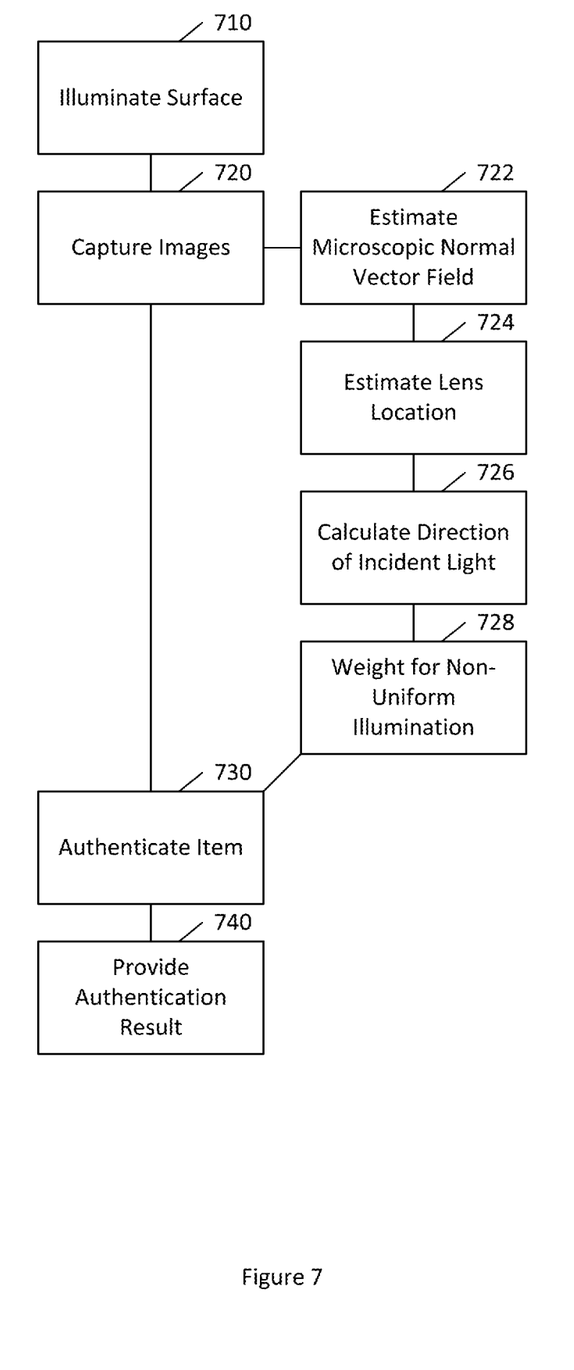
FIG. 7 illustrates a method according to certain embodiments of the present invention.

FIG. 7 illustrates a method according to certain embodiments of the present invention. As shown in FIG. 7, a method can include, at 710, illuminating a surface of an item with a lighting source of a mobile device. The method can also include, at 720, capturing a plurality of images of the surface by a camera of the mobile device during the illumination of the surface. The method can further include, at 730, authenticating the item based on the plurality of images.

The method can additionally include, at 722, estimating a microscopic normal vector field of the surface, wherein the authentication is based on the estimate of the microscopic normal vector field.

The authentication can be based on physical characteristics of the surface. For example, the authentication can be based on intrinsic physical characteristics of the surface. More particularly, in certain embodiments, the authentication can be based on physically unclonable properties of the surface.

The method can also include, at 724, estimating a location of a lens of the camera. The method can further include, at 726, calculating a direction of incident light for every pixel of an area of the surface based on the estimation. The authentication can be based on a microscopic normal vector field of the surface determined based on the calculated the direction of incident light. The method can additionally include, at 728, weighting non-uniform intensity according to different estimated distances from pixel locations to the lighting source when calculating the direction of incident light.

The method can further include, at 740, providing an authentication output to a user of the mobile device. The authentication can include detecting that the item is a duplicate or counterfeit. Thus, the output can be a "pass" or a "warning," "caution," or "counterfeit detected," or the like.

Figure 8:
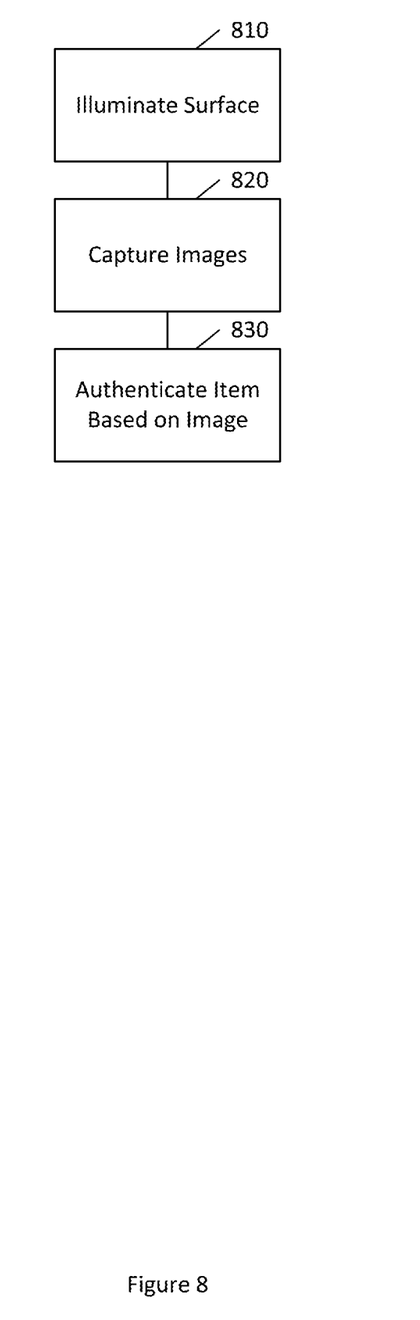
FIG. 8 illustrates a further method according to certain embodiments.

FIG. 8 illustrates a further method according to certain embodiments. As shown in FIG. 8, a method can include, at 810, illuminating a surface of an item with a lighting source. This light source may be a dominating light source, such as a flash. Various flash illumination technologies are permitted including, but not limited to, LED and incandescent illumination technologies.

The method can also include, at 820, capturing an image of the surface by a camera of a device during the illumination of the surface. The capturing can occur with a predefined camera-surface geometry. This predefined geometry can be determined using a viewfinder of the device, for example, aligning the camera's displayed picture edges with the edges of a reference box.

The method can further include, at 830, authenticating the item based on comparison of an appearance of the captured image to a reference appearance under the same predefined camera-surface geometry. Optionally, the reference appearance could be generated under a different camera-surface geometry but interpolated or otherwise translated to an appearance simulating the same predefined camera-surface geometry.

Although this example mentions a single image being captured and compared, certain embodiments may rely on the capture of multiple images and the comparison of one or more images to multiple reference images. This embodiment can be used in combination with the above embodiments, or may be used alone, if desired.

The method of FIG. 7 or FIG. 8 may be implemented by, for example, the user equipment 620 illustrated in FIG. 6. Furthermore, FIG. 4 can be considered a specific example of a general approach illustrated in FIG. 7. Additionally, using an estimated surface norm map can be used alone, optionally the estimated surface norm map can be used in combination with an appearance-based approach involving compared a captured image to a reference image, depending on, for example, types of paper surfaces and applications.

When a camera's capturing resolution is high enough, the area covered by each pixel may be relatively flat, and the normal vector assigned to the pixel may represent the physical surface direction of the area. The collection of the normal vectors therefore can serve as a fingerprint for the paper surface. When the resolution is lower than the aforementioned scenario, however, the normal vector can still serve as a meaningful quantity. More specifically, the norm maps estimated from low resolution images can be considered as a downsampled norm map using a virtual 2-D low-pass filter that relates the high and low resolution images.

Paper can be easily folded, resulting in a change of directions of those surfaces around the fold lines. In order to maintain a high correlation for true matches, the following strategies can be applied. A first strategy masks in correlation calculation those pixels whose surface directions are affected by folding. This method is intuitive but relies on the detection and segmentation of folded regions. As the distortion to the norm map field due to folding can be viewed as the addition of a slowly spatially varying trending surface, a second strategy is to apply detrending methods before calculating the correlation. For example, highpass filtering can be applied to remove the global trend. Such a highpass filter may be designed to properly reject the frequency components of the trending surface. Alternatively, parametric surfaces can be fitted to estimate the trending surface, and the resulting residue can be used to perform correlation. A practical challenge may lie in the selection of a parametric surface that neither overfits nor underfits.

Perturbation analysis shows that the method according to certain embodiments is robust to inaccurate estimates of camera locations, and using 6 to 8 images can achieve a matching accuracy of $10^{-4}$ in equal error rate (EER). For example, in order to obtain an EER of $10^{-4}$, one should on average acquire at least six flash images if the correlation follows a light tailed Gaussian distribution. In contrast, if the correlation deems to follow a heavy tailed Laplacian distribution, one should on average acquire at least eight flash images.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   illuminating a surface of an item with a lighting source of a device;
   capturing a plurality of images of the surface by a camera of the device during the illumination of the surface;
   authenticating the item based on the plurality of images;
   estimating a location of a lens of the camera; and
   calculating a direction of incident light for pixels of an area of the surface based on the estimation,
   wherein the authentication is based on a microscopic normal vector field of the surface determined based on the direction of incident light.

2. The method of claim 1, further comprising:
   estimating a microscopic normal vector field of the surface, wherein the authentication is based on the estimate of the microscopic normal vector field.

3. The method of claim 1, wherein the authentication is based on physical characteristics of the surface.

4. The method of claim 3, wherein the authentication is based on physically unclonable properties of the surface.

5. The method of claim 1, wherein the authentication is based on comparing the appearance of the plurality of images to reference images.

6. The method of claim 1, wherein the authentication comprises detecting that the item is a duplicate or counterfeit.

7. The method of claim 1, further comprising:
   weighting non-uniform intensity according to different estimated distances from pixel locations to the lighting source when calculating the direction of incident light.

8. The method of claim 1, further comprising:
   providing an authentication output to a user of the device.

9. An apparatus, comprising:
   a light of a device configured to illuminate a surface of an item;
   a camera of the device configured to capture a plurality of images of the surface during the illumination of the surface;
   a processor of the device configured to authenticate the item based on the plurality of images,
   estimate a location of a lens of the camera; and
   calculate a direction of incident light for pixels of an area of the surface based on the estimation,
   wherein the authentication is based on the direction of incident light.

10. The apparatus of claim 9, wherein the processor is further configured to estimate a microscopic normal vector field of the surface, wherein the authentication is based on the estimate of the microscopic normal vector field.

11. The apparatus of claim 9, wherein the authentication is based on physical characteristics of the surface.

12. The apparatus of claim 11, wherein the authentication is based on physically unclonable properties of the surface.

13. The apparatus of claim 9, wherein the authentication comprises detecting that the item is a duplicate or counterfeit.

14. The apparatus of claim 9, wherein the device comprises a mobile device.

15. The method of claim 9, wherein the authentication is based on comparing the appearance of the plurality of images to reference images.

16. The apparatus of claim 9, wherein the processor is further configured to weight non-uniform intensity according to different estimated distances from pixel locations to the lighting source when authenticating the item.

17. The apparatus of claim 9, further comprising:
    a user interface configured to provide an authentication output to a user of the device.

18. An apparatus, comprising:
    means for illuminating a surface of an item with a lighting source of a device;
    means for capturing a plurality of images of the surface by a camera of the device during the illumination of the surface;
    means for authenticating the item based on the plurality of images;
    means for estimating a location of a lens of the camera; and
    means for calculating a direction of incident light for pixels of an area of the surface based on the estimation,
    wherein the authentication is based on the direction of incident light.

19. The apparatus of claim 18, further comprising:
    means for estimating a microscopic normal vector field of the surface, wherein the authentication is based on the estimate of the microscopic normal vector field.

20. The apparatus of claim 18, wherein the authentication is based on physical characteristics of the surface.

21. The apparatus of claim 20, wherein the authentication is based on physically unclonable properties of the surface.

22. The apparatus of claim 18, wherein the authentication is based on comparing the appearance of the plurality of images to reference images.

23. The apparatus of claim 18, wherein the authentication comprises detecting that the item is a duplicate or counterfeit.

24. The apparatus of claim 18, further comprising:
means for weighting non-uniform intensity according to different estimated distances from pixel locations to the lighting source when calculating the direction of incident light.

25. The apparatus of claim 18, further comprising:
means for providing an authentication output to a user of the device.

26. A method, comprising:
illuminating a surface of an item with a lighting source;
capturing an image of the surface by a camera of a device during the illumination of the surface, wherein the capturing occurs with a predefined camera-surface geometry;
authenticating the item based on comparison of an appearance of the captured image to a reference appearance under the same predefined camera-surface geometry;
estimating a location of a lens of the camera; and
calculating a direction of incident light for every pixel of an area of the surface based on the estimation,
wherein the authentication is based on a microscopic normal vector field of the surface determined based on the direction of incident light.

* * * * *